Patented July 5, 1949

2,475,194

UNITED STATES PATENT OFFICE 2,475,194

METHOD OF MOLDING THERMOSETTING COMPOSITIONS IN GLASS MOLDS

Arthur S. Nyquist, Cos Cob, and Edward L. Kropa, Old Greenwich, Conn., assignors to American Cyanamid Company, New York, N. Y., a corporation of Maine No Drawing. Application October 22, 1946, Serial No. 704,984

8 Claims. (Cl. 18—55)

This invention relates to a method of forming or shaping a thermosetting composition, and more particularly to a method of forming a thermosetting composition in a mold having a surface of glass which is adjacent said composition during the forming or shaping operation, and which composition, e. g., an acidic thermosetting composition, normally adheres to the glass surfaces of the mold during such operation.

Ordinary glass is an extremely useful medium for shaping objects, e. g., plastic articles, in the form of films, sheets and castings. It is a material which normally has one of the smoothest, most highly polished surfaces known, is readily available, and is relatively inexpensive. Glass has been suggested as the construction material of a mold for use in the compression molding of plastic materials and in the post-finishing or polishing of plastic or resinous sheets. Glass is frequently employed for all of these uses in the laboratory, but is looked upon less favorably for production uses. One reason for this is that certain classes of moldable compositions, e. g., acidic thermosetting compositions, adhere very tenaciously to untreated glass, the adherence being so great that it is frequently impossible to separate the glass from such a composition. Where the adhesion is particularly tenacious, particles of glass are frequently torn from the glass surface. In some cases the adhesion of the glass to the molded composition is not uniform over the whole surface of the molding, with the result that a torque is set up which results in the fracture of both the resin and the mold. In other cases, even though the adhesion may be moderate, the tools that are used to separate the molding from the mold may result in marring the surface finish of the glass.

The aforementioned difficulties are even more pronounced when a casting, film or sheet of, for instance, an acidic thermosetting composition, e. g., a synthetic thermosetting resin having an acid value of at least 20, more particularly from 30 to 80 or more in flowable state, is cast or molded in a glass mold or on or between glass plates to obtain a casting, film or sheet thereof, and efforts then are made to separate the shaped article from the glass surfaces. The molded piece usually adheres tenaciously to the glass and cannot be readily separated from it. When such cast or molded articles are separated from the glass plate or mold, they ordinarily have a surface finish that is unsatisfactory from a commercial standpoint.

There has long been a need in the plastics art for a suitable method or means of treating glass surfaces so that, for example, acidic thermosetting compositions cured in contact therewith could be readily separated in cured state from the glass surface while at the same time affecting neither the glass surface nor the surface of the cured or thermoset composition. This need has increased in recent years with the advent of the newer, liquid, polymerizable compositions (examples of which are given hereinafter), which can be used at lower temperatures and pressures than those previously commonly employed in the plastics art, and the desirability of polymerizing or curing such thermosetting compositions in or on a glass form or mold.

The treating agent used must be one which will not inhibit the curing of the thermosetting composition. It should be relatively cheap and easy to apply. It should provide a uniform coating over the glass surface so that there will be no irregularities in the surface of the thermoset material. It should act effectively as a parting agent in facilitating the removal of the cured composition from the glass, but should not be so active a parting agent that the thermosetting material will shrink excessively therefrom during curing and cause curvatures or other irregularities in the thermoset piece. In other words, the treating agent should have some tendency to adhere to the thermosetting composition during curing of the latter, but should be readily separable from the cured material.

From the aforementioned requisites of a satisfactory parting agent for facilitating the separation, from a glass surface, of a thermoset material obtained by curing, for example an acidic thermosetting composition, it will be seen that the number of agents or substances that would meet these requirements is relatively few.

The present invention is based on our discovery that solutions of stannous compounds which are convertible to stannous oxide, more particularly an aqueous liquid composition comprising water and a stannous compound which, prior to incorporation in said liquid composition, is a member of the class consisting of stannous hydroxide and stannous compounds which are hydrolyzable in contact with water to stannous hydroxide, for instance aqueous solutions (preferably acidulated aqueous solutions) of a stannous halide, e. g., stannous chloride, stannous bromide, etc., meet the foregoing requisites and make it possible to remove easily and satisfactorily at an elevated temperature the hard, thermoset composition from a glass mold or plate which has been treated therewith. The coating of tin oxide that is formed on the surface of the glass is exceptionally hard and wear-resistant. It has good adherence to the glass, being such that the treated glass mold may be used a number of times before another application of the treating agent is required. The thermoset composition is separated from the mold at a temperature of at least about 60° C., more particularly at a temperature within the range of 60° to 200° C. Higher temperatures are not precluded, but no particular advantage ordinarily accrues from their use.

In practicing our invention, that is, in forming or shaping an acidic or other thermosetting composition which normally adheres to glass in contact therewith during such an operation, in or on a mold having a surface of glass which subsequently is in contact with said composition, we first coat the glass surface (usually after first cleaning it, e. g., with a detergent) with a solution of a soluble stannous compound which is convertible to stannous oxide (e. g., by immersion, brushing, spraying or other suitable means), dry the coated glass surface (e. g., by allowing it to stand exposed to the air for a short period, by heating in an oven, or by the application of a blast of warm air), introduce into the resulting mold the thermosetting composition which is to be formed or shaped, convert the said composition in the said mold (e. g., by heating, with or without a catalyst, or with or without ultraviolet light, at a temperature within the range of 50° to 130° C.), and remove the thermoset composition from the mold while both the mold and contents are hot, that is, at a temperature of at least about 60° C. The thermoset material may be removed from the mold at a temperature not higher than the temperature at which the mold and contents previously had been heated, or it may be removed at a higher temperature. In the latter case the mold and contents may be more highly heated, for example by immersing or partially immersing the same in an oil or glycerine bath heated substantially above the temperature of molding or curing the thermosetting material.

It is essential that the cured or thermoset material be removed hot from the mold. If the mold and contents are materially below 60° C., for example at room temperature (20° to 30° C.), before the cured material is taken from the mold, the thermoset composition adheres tenaciously to the glass surface and cannot be removed satisfactorily from the mold. This adhering tendency of the cured material to the treated glass at a low temperature may be taken advantage of in certain applications of acidic thermosetting compositions. For instance, an aqueous, acidic solution of stannous chloride may be used in treating the surfaces of the glass components of a compound optical element which are to be cemented together with a polymerizable mixture including certain unsaturated alkyd resins, as disclosed in the copending applications of one of us (Edward L. Kropa), Serial No. 516,093, filed December 29, 1943, now Patent No. 2,453,665, and Serial No. 519,199, filed January 21, 1944, now Patent No. 2,453,666.

Our invention is applicable to the forming or shaping of any thermosetting composition in a mold having a surface of glass which is in contact with said composition during the forming or shaping operation, which composition normally adheres to the glass surfaces of the mold during such an operation. It is especially suitable for use in the fabrication of acidic thermosetting compositions, more particularly acidic thermosetting compositions comprising an unsaturated alkyd resin, and still more particularly liquid, acidic thermosetting compositions comprising (1) an unsaturated alkyd resin obtained by reaction of ingredients comprising a polyhydric alcohol (e. g., ethylene glycol, diethylene glycol, glycerol or other dihydric or other polyhydric alcohol) and an alpha,beta-unsaturated polycarboxylic acid (e. g., maleic, fumaric, aconitic or other alpha,beta-unsaturated dicarboxylic or other polycarboxylic acid) and (2) a monomeric material which is copolymerizable with the alkyd resin of (1) and which contains a $CH_2=C<$ grouping, more particularly a vinyl benzene (e. g., styrene, dichlorostyrenes, divinyl benzenes, mono- and dichloro divinyl benzenes, etc.), a polyallyl ester (e. g., diallyl phthalate, diallyl succinate, diallyl maleate, etc.) and others.

In order that those skilled in the art better may understand how the present invention may be carried into effect, the following examples are given by way of illustration and not by way of limitation. All parts are by weight.

*Example 1*

This example illustrates the results obtained when an acidic thermosetting resin is cured in a glass mold, the inner surfaces of which have been given merely a cleansing treatment with a detergent.

Glass plates, which subsequently were assembled to form a mold, were cleaned by treatment with a solution of dioctyl sodium sulfosuccinate, and allowed to dry by standing at room temperature. The plates were assembled, with the cleaned surfaces inward, to form a mold into which was poured a liquid, acidic thermosetting (heat-curable) composition which comprised, by weight, about 2 parts of an unsaturated alkyd resin having an acid number of about 50, specifically diethylene glycol fumarate sebacate, about 1 part styrene, 0.003 part hydroquinone (inhibitor) and 0.015 part of a polymerization catalyst, specifically lauroyl peroxide. The diethylene glycol fumarate sebacate was obtained by effecting reaction between 6 mols diethylene glycol, 5 mols fumaric acid and 1 mol sebacic acid. The mold and contents were heated for about 16 hours at about 50° C. and then for about 2 hours at 100° C. to polymerize the polymerizable or thermosetting composition and to convert it to a hard, polymeric or thermoset resinous state.

The mold adhered tenaciously to the solid resin, and could not be stripped therefrom either hot or cold.

*Example 2*

The same procedure was followed as described under Example 1 with the exception that the glass plates, after cleaning with the detergent, were swabbed with an aqueous, acidulated stannous chloride solution, more particularly a solution composed of, by weight, 15% concentrated hydrochloric acid (about 37% HCl), 40% stannous chloride dihydrate and 45% water, rinsed with water, air dried, and buffed, specifically by rubbing with finely divided calcium carbonate.

There was no adhesion between the hot solid resin and hot mold, and the latter was readily separated from the former (or vice versa) while each was hot, more particularly at a temperature of at least 60° C., e. g., at a temperature within the range of 75° to 200° C. or higher. The glass surfaces of the mold were not marred when the resin was separated therefrom, and the resin surfaces were smooth and free from any indication of adhesion.

The above procedure may be varied considerably. For instance, it will be apparent that, if the glass surface initially is fairly clean, the cleansing step may be omitted. Likewise, either or both of the steps of rinsing with water (after the application of the stannous chloride solution) and the buffing of the dried surface may be omitted, although in general the inclusion of these steps in the process seems to give somewhat better results, possibly because they provide additional means of forming a uniform film of the stannous compound, less than a mil in thickness, upon the glass surface. The water rinse washes some of the stannous compound from the glass, but a sufficient amount of the compound adheres to the glass to provide the desired results.

Likewise, it is not necessary to use an acidulated solution of the stannous compound. In the case of stannous halides, the main advantage of using an acidulated solution is that the acid improves the stability of the halide solution, and obviates or minimizes the formation and precipitation of stannous hydroxide from the solution prior to use. Hence we prefer to use an acidulated solution, employing sufficient acid (e. g., hydrochloric acid in the case of a stannous chloride solution) in the solution to avoid the precipitation of stannous hydroxide. For instance, in an aqueous solution of stannous chloride or stannous chloride dihydrate, concentrated hydrochloric acid may be used in an amount, by weight, corresponding to from about 5 to 25%, stannous chloride or stannous chloride dihydrate, from about 10 to 50%, and water or a mixture of water and alcohol constituting the remainder, the higher percentage of hydrochloric acid being used with the higher percentage of the stannous compound. We prefer to use the stannous compound in an amount sufficient to form a saturated or almost saturated solution, although dilute solutions may be used if desired.

Any soluble stannous compound, e. g., a water-soluble stannous compound, which is convertible to stannous oxide may be employed in practicing our invention. Illustrative examples of such compounds, in addition to stannous chloride, are stannous bromide, stannous iodide, stannous acetate, stannous nitrate, stannous sulfate, stannous oxalate, stannous tartrate, stannous hydroxide, etc. Stannous fluoride is not precluded, but its use is not preferred since it requires considerable care in utilizing it because of the etching of the glass surfaces caused by the hydrofluoric acid which forms upon hydrolysis of the fluoride. In certain instances organic tin (stannous) compounds, for instance alkyl tin oxides (e. g., butyl tin oxide, etc.) may be used expediently.

If an acidulated solution is used, a strong inorganic acid is generally employed, e. g., hydrochloric, hydrobromic, sulfuric, nitric, etc., or other acid which will serve to stabilize the solution of the stannous compound and which will not attack the glass surfaces excessively upon application thereto of the acidulated solution. If a soluble stannous salt is used, a convenient practice is to employ an acid corresponding to the acid radical of the stannous salt.

For purpose of economy we prefer to use water solutions of the soluble stannous compound, but other solutions also may be employed, for instance solutions of water and an alcohol or an alcohol-ether, e. g., methyl alcohol, ethyl alcohol, isopropyl alcohol, butyl alcohol, glycerol, ethylene glycol, diethylene glycol, propylene glycol, butylene glycol, monoethyl ether of ethylene glycol, monoethyl ether of diethylene glycol, monobutyl ether of ethylene glycol, monobutyl ether of diethylene glycol, etc. If a substantially nonaqueous solution of the soluble stannous compound is used as the treating agent, then there should be enough water on the glass surface prior to application of the agent thereto to facilitate its hydrolysis to stannous hydroxide. The stannous hydroxide is believed to decompose to stannous oxide either during the drying of the coated glass or upon curing of the thermosetting material, as by heating, in contact with the treated glass surface.

If the glass is buffed after the application of the parting agent, or after a water or other rinse (if employed), any suitable buffing agent may be used. Illustrative examples of suitable buffing agents, in addition to finely divided or precipitated calcium carbonate, are diatomaceous earth, kieselguhr, pumice, tripoli, chalk, oils, etc. If desired, the glass may be buffed in lieu of or after cleaning the glass to be treated with the parting agent, for example, after washing with a soap solution or other detergent, followed by drying. The buffing of a used, treated glass mold also provides an indication as to when a retreatment of the glass with the stannous compound is required. If the buffing agent adheres or tends to adhere to parts of the glass surface, then retreatment with the stannous compound is advisable.

Illustrative examples of thermosetting (heat-curable) compositions which normally adhere to the surfaces of a glass mold during a forming or shaping operation are some of the natural resins, more particularly acidic, thermosetting natural resins e. g., shellac, etc.; the polymerizable, acidic unsaturated alkyd resins, e. g., ethylene glycol maleate, diethylene glycol fumarate, propylene glycol maleate phthalate, diethylene glycol fumarate adipate, propylene glycol tetrahydroabietyl fumarate, butylene glycol itaconate, butylene glycol tetrahydroabietyl fumarate, ethylene glycol citraconate, diethylene glycol mesaconate, glycerol itaconate, ethylene glycol fumarate succinate, etc.; mixtures of such alkyd resins with other monomeric materials which are copolymerizable therewith, more particularly monomeric materials containing a $CH_2=C<$ grouping, e. g., an allyl grouping; and other acidic thermosetting materials. Illustrative examples of monomeric materials containing a $CH_2=C<$ grouping which may be copolymerized with a compatible, acidic unsaturated alkyd resin are dichlorostyrenes, dimethylstyrenes, triallyl phosphate, diallyl adipate, diallyl sebacate, diallyl citraconate, vinyl naphthalene, vinyl furane, ethyl vinyl ether, vinyl acetate, vinyl propionate, diallyl ether, methyl vinyl ketone, methylene malonic esters (e. g., methylene methyl malonate), acrylic and methacrylic esters (e. g., methyl, ethyl, propyl, butyl, etc., acrylates and methacrylates), acrylonitrile, acrylamide, etc. Numerous examples of other acidic thermosetting compositions, both unsaturated alkyd resins and of other monomeric materials which are copolymerizable therewith, to which the present invention is applicable are given in various copending applications of one of us (Edward L. Kropa), for instance in applications Serial No. 516,093, filed December 29, 1943, now Patent No. 2,453,665, Serial No. 519,199, filed January 21, 1944, now Patent No. 2,453,666, Serial No. 540,142, filed June 13, 1944, now Patent No. 2,443,740, Serial No. 555,194, filed September 21, 1944, now Patent No. 2,443,741, Serial No. 616,648, filed September 15, 1945, Serial No. 653,959, filed March 12, 1946, and Serial No. 700,833, filed October 2, 1946. Reference is also made to these same applications for additional details on polymerization conditions, such as catalysts employed, temperatures and times of polymerization, etc.

Our invention may be used alone or in combination with other methods of treating glass surfaces of a mold to facilitate the separation therefrom of a solid thermoset material which normally adheres tenaciously to such surfaces. For example, it may be used before, during or after treating the surfaces of the glass with vapors of organohalogenosilanes, more particularly hydrocarbon-substituted halogenosilanes such, for instance, as methylchlorosilanes, phenylchlorosilanes, methylphenylchlorosilanes, etc., or with liquid methylpolysiloxanes, liquid phenylpolysiloxanes, etc. Such silanes and polysiloxanes have also been found to be effective when used alone as a parting agent for the treatment of glass surfaces of a mold or other structure upon which is formed or shaped a thermosetting composition, more particularly a liquid, acidic thermosetting composition, which normally adheres to the untreated glass surfaces of the mold.

The treatment of glass surfaces with a stannous compound as described hereinbefore with particular reference to the treatment of glass surfaces also may be utilized in forming a film or coating of stannous oxide on the surfaces of hard, synthetic resinous materials, e. g., polymerized or thermoset materials such as described above and in the aforementioned Kropa applications. In this way the resinous materials are provided with harder, more mar-resistant surfaces.

What we claim as new and desire to secure by Letters Patent of the United States is:

1. The method of forming an acidic thermosetting composition in a mold having a surface of glass which is adjacent said composition during the forming operation, said method comprising coating said surface with an aqueous liquid composition comprising water and a stannous compound which, prior to incorporation in said liquid composition, is a member of the class consisting of stannous hydroxide and stannous compounds which are hydrolyzable in contact with water to stannous hydroxide, drying the coated glass surface having thereon a coating comprising stannous hydroxide, introducing into the resulting mold the aforementioned thermosetting composition, converting the said composition in said mold to a hard thermoset state, the coating on said glass surface after said drying and converting steps comprising stannous oxide, and separating the thermoset composition from the said mold at a temperature within the range of 60° to 200° C.

2. The method of forming an acidic thermosetting composition comprising an unsaturated alkyd resin in a mold having a surface of glass which is adjacent said composition during the forming operation, said method comprising coating said surface with an aqueous liquid composition comprising water and a stannous compound which, prior to incorporation in said liquid composition, is a member of the class consisting of stannous hydroxide and stannous compounds which are hydrolyzable in contact with water to stannous hydroxide, drying the coated glass surface having thereon a coating comprising stannous hydroxide, introducing into the resulting mold a liquid, acidic thermosetting composition comprising an unsaturated alkyd resin, heating the mold and contents at a temperature within the range of 50° to 130° C. for a period sufficient to convert the said composition to a hard thermoset state, the coating on said glass surface after said drying and heating steps comprising stannous oxide, and separating the thermoset composition from the said mold at a temperature within the range of 60° to 200° C.

3. A method as in claim 2 wherein the stannous compound is stannous chloride.

4. The method of molding a liquid, acidic thermosetting composition comprising (1) an unsaturated alkyd resin obtained by reaction of ingredients comprising a polyhydric alcohol and an alpha,beta-unsaturated polycarboxylic acid and (2) a monomeric material which is copolymerizable with the alkyd resin of (1) and which contains a $CH_2=C<$ grouping, said method comprising coating the clean inner surfaces of a glass mold with an acidulated aqueous solution of stannous chloride, drying the coated surfaces of the said mold, said surfaces before drying having thereon a coating comprising stannous hydroxide resulting from the hydrolysis of said stannous chloride, introducing into the resulting mold the aforementioned thermosetting composition, heating the mold and contents at a temperature within the range of 50° to 130° C. for a period sufficient to convert the said composition to a hard thermoset state, the coating on said glass surfaces after said drying and heating steps comprising stannous oxide, and separating the thermoset composition from the said mold at a temperature within the range of 60° to 200° C.

5. The method of molding a liquid, acidic thermosetting composition comprising (1) an unsaturated alkyd resin obtained by reaction of ingredients comprising a dihydric alcohol and an alpha,beta-unsaturated dicarboxylic acid and (2) a vinyl benzene, said method comprising cleaning the inner surfaces of a glass mold, coating the cleaned surfaces with an aqueous solution of stannous chloride and hydrochloric acid, drying the coated surfaces, said surfaces before drying having thereon a coating comprising stannous hydroxide resulting from the hydrolysis of said stannous chloride, introducing into the resulting mold the aforementioned thermosetting composition, heating the mold and contents at a temperature within the range of 50° to 130° C. for a period sufficient to convert the said composition to a hard thermoset state, the coating on said glass surfaces after said drying and heating steps comprising stannous oxide, and removing the thermoset composition from the said mold at a temperature within the range of 60° to 200° C.

6. The method of molding a liquid, acidic thermosetting composition comprising (1) an unsaturated alkyd resin obtained by reaction of ingredients comprising a dihydric alcohol and an alpha,beta-unsaturated dicarboxylic acid and (2) styrene, said method comprising cleaning the inner surfaces of a glass mold, coating the cleaned surfaces with an aqueous solution of stannous chloride dihydrate and hydrochloric acid, rinsing the coated surfaces with water, drying the rinsed surfaces, said surfaces before drying having thereon a coating comprising stannous hydroxide resulting from the hydrolysis of said stannous chloride dihydrate, buffing the dried surfaces, introducing into the resulting mold the aforementioned thermosetting composition, heating the mold and contents at a temperature within the range of 50° to 130° C. for a period sufficient to convert the said composition to a hard thermoset state, the coating on said glass surfaces after said drying and heating steps comprising stannous oxide, and removing the thermoset composition from the said mold at a temperature not less than about 60° C. and not higher than the temperature at which the mold and contents previously had been heated.

7. The method of molding a liquid, acidic thermosetting composition comprising a mixture including, by weight, about 2 parts diethylene glycol fumarate sebacate and about 1 part styrene, said method comprising cleaning the inner surfaces of a glass mold, coating the cleaned surfaces with a solution containing, by weight, about 15% concentrated hydrochloric acid, about 40% stannous chloride dihydrate and about 45% water, rinsing the coated surfaces with water, drying the rinsed surfaces, said surfaces before drying having thereon a coating comprising stannous hydroxide resulting from the hydrolysis of said stannous chloride dihydrate, buffing the dried surfaces with finely divided calcium carbonate, introducing into the resulting mold the aforementioned thermosetting composition, heating the mold and contents at a temperature within the range of 50° to 130° C. for a period sufficient to convert the said composition to a hard thermoset state, the coating on said glass surfaces after said drying and heating steps comprising stannous oxide, and removing the thermoset composition from the said mold at a temperature not less than about 60° C. and not higher than the temperature at which the mold and contents previously had been heated.

8. The method of forming acidic thermosetting compositions in a mold having a surface of glass which is adjacent to a charge of said composition during the forming operation, said method comprising coating said surface with an aqueous liquid composition comprising water and a stannous compound which, prior to incorporation in said liquid composition, is a member of the class consisting of stannous hydroxide and stannous compounds which are hydrolyzable in contact with water to stannous hydroxide, drying the coated glass surface having thereon a coating comprising stannous hydroxide, introducing into the resulting mold a charge of the aforementioned thermosetting composition, converting the said composition in said mold to a hard thermoset state, the coating on said glass surface after said drying and converting steps comprising stannous oxide, separating the thermoset composition from the said mold at a temperature within the range of 60° to 200° C., and re-using the said mold in forming another charge of acidic thermosetting composition therein without re-coating the surface of the glass which is adjacent the said composition during the forming operation, the said thermosetting composition being converted in the said mold to a hard thermoset state and the resulting thermoset composition being separated from the said mold at a temperature within the range of 60° to 200° C.

ARTHUR S. NYQUIST.
EDWARD L. KROPA.

REFERENCES CITED

The following references are of record in the file of this patent:

UNITED STATES PATENTS

| Number | Name | Date |
| --- | --- | --- |
| 1,353,152 | Dinwiddie | Sept. 21, 1920 |
| 2,318,959 | Muskat et al. | May 11, 1943 |